United States Patent [19]
Yan

[11] 4,096,097
[45] Jun. 20, 1978

[54] METHOD OF PRODUCING HIGH QUALITY SPONGE COKE OR NOT TO MAKE SHOT COKE

[75] Inventor: Tsoung-Yuan Yan, Philadelphia, Pa.

[73] Assignee: Mobil Oil Corporation, New York, N.Y.

[21] Appl. No.: 754,288

[22] Filed: Dec. 27, 1976

[51] Int. Cl.² .............................................. H01B 1/06
[52] U.S. Cl. .................................. 252/510; 252/502; 264/105; 208/131; 208/106; 208/46; 252/421; 252/444; 252/445
[58] Field of Search ......................... 208/131, 46, 106; 264/105; 252/444, 445, 421, 502, 510; 423/449

[56] References Cited
U.S. PATENT DOCUMENTS

| | | | |
|---|---|---|---|
| 2,412,879 | 12/1946 | Fischer | 208/126 |
| 2,582,764 | 1/1952 | Bailey | 264/105 X |
| 2,977,325 | 3/1961 | Feustel et al. | 252/445 |
| 3,284,334 | 11/1966 | Metrailer et al. | 264/105 X |
| 3,506,745 | 4/1970 | Juel et al. | 264/105 X |
| 3,617,515 | 11/1971 | Bloomer | 208/131 |
| 3,876,505 | 4/1975 | Stoneburner | 252/445 X |

Primary Examiner—Richard E. Schafer
Assistant Examiner—E. Suzanne Parr
Attorney, Agent, or Firm—Charles A. Huggett; Carl D. Farnsworth

[57] ABSTRACT

High quality petroleum sponge coke suitable for use in the manufacture of electrodes is produced by adding an effective amount of an oxygen-containing carbonaceous material which tends to decompose at high temperatures, such as sawdust, coal, or lignite to delayed coker fresh and/or recycle feed. This addition eliminates or reduces the formation of shot coke and promotes the formation of high-quality, easy-to-grind petroleum sponge coke.

27 Claims, No Drawings

METHOD OF PRODUCING HIGH QUALITY SPONGE COKE OR NOT TO MAKE SHOT COKE

BACKGROUND OF THE INVENTION

This invention relates to a process for the production of an electrode grade petroleum coke having superior grindability qualities. More specifically, this invention is directed towards an improved delayed coking process which produces a soft, nonabrasive coke particularly suitable for use in the manufacture of carbon anodes used in the electrolytic production of aluminum.

Petroleum coke is the residue resulting from the thermal decomposition or pyrolysis of high-boiling hydrocarbons, particularly residues obtained from cracking or distillation of asphaltenic crude distillates. The hydrocarbons employed as feedstocks in coking operations usually have an initial boiling point of about 700° F or higher, an API gravity of about 0° to 20°, and a Conradson carbon residue content of about 5 to 40 weight percent. The coking process is particularly advantageous when applied to refractory, aromatic feedstocks such as slurry decanted oils from catalytic cracking and tars from thermal cracking.

Delayed coking is a process to increase yields of gas oil and gasoline which employs a heating means, a coking chamber designed to accumulate substantial quantities of coke between cleanings, and a fractionator which recovers valuable constituents from the volatiles driven off from the coking chamber. In a typical delayed coker, preheated coker feedstock is combined with heavy residue passing from the bottom of the fractionator and this mixture is heated in a tube still heater or furnace to a temperature of about 900° F (generally within the range from 800°-1100° F). The heated mixture then passes to a coking drum where the residence time is sufficient for coke to form and settle from the mixture. The vapors from the coking drum are returned to the fractionator where gas, gasoline, and gas oil are separated and leave the unit. The heavier materials appear in the bottom of the fractionator and are recycled to the coking operation. When coke builds up to a predetermined level in one of the coking drums, flow is diverted to another drum so that the operation is semi-continuous. Thus, drums are operated in pairs with one on-stream while the other is being decoked.

The principal market for petroleum coke is the aluminum industry, which consumes coke in the form of carbon anodes employed in the electrolytic recovery of primary aluminum. Although the specifications for green and calcined coke set by the aluminum industry show some variations, they may be summarized as shown in Table 1 below.

Table 1

| Specifications of Petroleum Coke For Manufacture of Aluminum Anodes | | |
|---|---|---|
| | Green | Calcined |
| Volatiles, percent max | 12.0 | 0.5 |
| Ash, percent max | 0.15–1.0 | 0.05–0.8 |
| Calcium, percent max | 0.12 | 0.12 |
| Iron, percent max | 0.06 | 0.05–0.08 |
| Silicon, percent max | 0.06–0.08 | 0.05–0.08 |
| Sodium, percent max | 0.12 | 0.12 |
| Combined Fe-Si, percent max | 0.14 | 0.14 |
| Combined Na-Ca, percent max | 0.12–0.15 | 0.15 |
| Soluble salts, percent max | 0.2–0.8 | 0.8 |
| Sulfur, percent max | 1.5–2.0 | 1.0–2.0 |
| Real Density | | 2.01–2.07 |

A description of the processes for producing electrode grade coke from a residue obtained by the thermal cracking of certain hydrocarbon distillates obtained from asphaltic crude oils, followed by the delayed coking of the residue under controlled conditions is described in U.S. Pat. No. 2,775,549, issued to Shea. As disclosed therein, a coking stock suitable for the production of a premium coke is characterized by the absence of materials or components which would ordinarily produce inferior quality coke, such as asphaltic and napthenic base oils. Such materials have a tendency to coke at a much lower temperature and at a faster rate than the rest of the coker feed, resulting in premature and non-uniform coking. According to the patent, these materials should be removed from coker stocks prior to coking by a heat treating step or a solvent extraction step or both.

Other more recent patents have also disclosed methods of controlling the effects of premature coking. For example, U.S. Pat. No. 3,547,804 discloses a process wherein the delayed coker feed is diluted with a diluent which is not substantially cokable and heated to a temperature varying between 715° to 770° F before raising the mass to the coking temperature to complete the coking. The object of the method is to avoid the formation of amorphous coke about minute particles of massy coke resulting from premature coking, i.e., coking which occurs in the asphalt→pitch step of the production of coke from aromatic hydrocarbons. The diluent is employed to avoid amorphous coke formation during heating within the specified temperature range so that only crystal nuclei of acicular structure are formed during this period. Subsequently, when the mass is heated to the coking temperature, coke crystals are developed about these nuclei as centers.

U.S. Pat. No. 3,704,224 discloses the use of graphite seeding to improve coke quality. Fine colloidal graphite particles are added to the delayed coker feedstock as it passes from the furnace to the coke drum. Thus in this process, nuclei are added to the coker feedstock by seeding after the coker feedstock has been heated to the coking temperature; whereas, in the diluent process of U.S. Pat. No. 3,547,804 nuclei are formed in the feedstock before it is heated to the coking temperature.

A problem in applications requiring size reduction of the coke product which none of the foregoing disclosures address is the grindability of the resulting coke mass. To make either artificial graphite electrodes or amorphous carbon electrodes, coke must be ground to a very fine size before being calcined and admixed with a carbonaceous binder (usually coal tar) and charged to the electrode fabrication system. Therefore, a highly desirable quality of electrode-grade coke is high grindability. Some cokes are difficult to grind because they contain hard, dense, graphitic particles up to about one inch in diameter. Such coke particles may be referred to as "shot coke". The Hardgrove index of shot coke may range as low as 20 to 30 percent. A more desirable coke may be referred to as "sponge coke," which has a structure of porosity and is therefore a relatively easy-to-grind coke. The Hardgrove index of sponge coke is within the range from about 30 to 60 percent or higher. Accordingly, an improved delayed coking process which produces sponge coke conforming to the specifications set for green coke to be used in the preparation of carbon anodes (see Table 1) is needed.

A number of methods involving the concurrent processing of oil and coal or other carbonaceous materials have been suggested in the prior art. For example, U.S.

Pat. No. 2,412,879 contains a description of a method of forming highly frangible, relatively soft coke by continuously coking a heavy petroleum oil in the presence of from 1 to 10 percent by weight of added cellulose linters, threads, sawdust, wood flour, or other cellulosic materials in divided form. More recently, processes for the treatment of coal and related materials with relatively low-boiling, highly aromatic oils to extract liquid constituents from the coal have been developed (see U.S. Pat. No. 3,870,621). However, none of these processes are directed toward the production of electrode grade coke; review of these and related disclosures has not revealed a coking process wherein the principal feedstream is a petroleum-derived coking stock and the product coke is a sponge coke advantageously employed in the manufacture of carbon electrodes.

SUMMARY OF THE INVENTION

This invention provides an improved delayed coking process which produces a high quality, relatively easy-to-grind sponge coke suitable for use as a filler in the manufacture of carbon electrodes, particularly those employed as anodes in aluminum production. Furthermore, the process of this invention avoids the production of shot coke and thereby minimizes production of fuel coke having substantially less market value than electrode grade coke. Moreover, this invention increases both the yield of coke and the quantity of valuable clean fuel recovered from delayed coking process fractionator.

In accordance with the invention, it has now been found that the addition of 0.5 to 20 percent by weight of an oxygen-containing, carbonaceous material which decomposes under coking conditions to delayed coker fresh and/or recycle feed promotes the formation of high quality sponge coke. Preferably, this addition will be within the range from 0.5 to 10 percent by weight. Although the additive can most conveniently be dispersed in the hot recycle stream from the delayed coker fractionator because the additive partially dissolves therein to form an easily handleable slurry, the additive can also be dispersed in the fresh feed to the coker. It is also considered to be within the scope of this invention to add the carbonaceous material either to a fresh or recycle feedstream entering the fractionator or to a recycle stream passing from the fractionator. However, it is preferred to add the carbonaceous material downstream of the fractionator to avoid fractionator column plugging problems.

The oxygen content of the carbonaceous additive should be within the range of from 5 percent to 50 percent or more by weight. The oxygen content will usually be no higher than 60 weight percent. Carbonaceous materials which are effective, abundant, and low-cost additives include comminuted coal (anthracite coal which has an oxygen content less than 5 percent is not preferred) and lignite and materials such as bagasse, sugar beet waste, sawdust (wood), and other cellulosic wastes. Particularly preferred additives are subbituminous coal and lignite.

To avoid contaminating the product coke, inorganic substances, particularly alkali metals, may be removed from the carbonaceous additive. This may be accomplished by employing deashed or solvent-refined coal or by treating the carbonaceous material with dilute mineral acid to leach out the objectionable minerals, reducing the total ash to about 1 percent or less. However, such a deashing step will not usually be necessary because of the small amount of carbonaceous material added to the petroleum derived coking stock.

DETAILED DESCRIPTION OF THE INVENTION

A highly desirable quality of petroleum coke to be used in the production of carbon electrodes is a highly grindability index. The grindability index is a relative measure of the ease with which coke may be pulverized. The A.S.T.M. recognizes two methods by which such an index may be determined:

(1) the Hardgrove machine method (A.S.T.M. D409-37T); and (2) the ball-mill method (A.S.T.M. 408-37T).

In the Hardgrove method, a prepared sample receives a definite amount of grinding energy in a ball-ring pulverizer. The unknown sample is compared with a coal chosen as having 100 grindability and the index of the unknown is calculated based on the weight of material passing through a No. 200 sieve. In the ball-mill method, the number of revolutions of a ball-mill required to grind the unknown sample so that 80 percent of the sample passes through a No. 200 sieve is measured. This number is compared with the results of coal chosen as having 100 grindability and the index computed.

These tests, while very useful when evaluating the size and type of mill needed to produce a specified tonnage and the power requirement for grinding, may give misleading results, particularly in the context of evaluating the need for and the effectiveness of the present invention. Shot coke has been defined as hard, dense graphitic particles up to about one inch in diameter. The shot coke is a component of the coke mass, and although it is referred to as a "particle," it will be understood that it is not always a particle discontinuous from the coke mass but rather is often a "pocket" of dense material within the continuous coke mass. Since both of the foregoing grindability methods are necessarily performed on relatively small sample sizes and measure the average grindability of the sample, the existence of shot coke will not ordinarily be adequately reflected by the grindability tests. However, the problems caused by shot coke in a continuous, large scale grinding operation are obvious; shot coke will build up in the system, consuming a large excess of power over that required to process sponge coke and causing a substantially higher rate of wear in the mills.

Because of this analytical difficulty, the practice of this invention is necessarily guided by observation of a full-scale grinding operation. The effective amount of the oxygen-containing carbonaceous material added to the delayed coker recycle feed must be determined by the quantity of shot coke observed in the subsequent grinding of the delayed coke product. The rate of addition will be in the range of 0.5 to 20 percent by weight of the delayed coker recycle feed and preferably will be in the range of 0.5 to 10 percent.

The oxygen content of the carbonaceous additive should be within the range of from 5 to about 50 weight percent or more of the additive. While not wishing to be bound by any particular theory of operability, it is postulated that the oxygen content is beneficial in producing sponge coke because of the increased porosity caused by the decomposition of the oxygen-containing molecules at the coking temperature and the release of $CO_2$, $H_2O$, etc., which rise through the coking mass, further promoting a porous structure and, hence, a coke product having a higher grindability index. The principle of this aspect of the invention is similar to that of foaming agents for plastic foams such as polyurethane.

The surprising aspect of the invention, when viewed in the context of the prior art, is the dissolution or partial dissolution of the carbonaceous additive in the hot coker recycle stream. Representative carbonaceous additives which may be employed are wood and lower rank coals which have been ground to a size convenient for handling, usually 50 mesh or smaller. Wood and lower rank coals have a composition quite high in oxygen-containing, asphaltic material. On the one hand, the prior art (for example, see the discussion of Shea patent, supra) teaches the removal of asphaltenic material prior to coking. On the other hand, the present invention adds asphaltenic material to the coking operation to produce an electrode grade coke having superior grindability qualities.

In the delayed coking process, asphaltene material tends to carbonize very fast, producing nuclei which grow independently of each other as the coking process proceeds. Thus, the present invention avoids the production of shot coke by forming a large number of nuclei in the coking stock rather than attempting to prevent the asphaltic nucleation by removing the asphaltic material. The principle of this aspect of the invention is similar to that of the "seeding" or "diluent" processes disclosed in the prior art. However, the present invention employs readily available, inexpensive materials to form nuclei (e.g., sawdust, lignite or lower rank coals) rather than relatively expensive graphite or a diluent-preheating operation. Moreover, the carbonaceous additive itself serves to increase the coke yield and, further, to produce a valuable gaseous fuel product during pyrolytic decomposition.

Because only small amounts of carbonaceous material are added to the coking stock, it may not be necessary to pretreat the carbonaceous material, other than to grind it to the proper particle size, in order to satisfy the product specification for electrode grade coke. However, in order to meet product coke specifications, it may be necessary to remove inorganic substances, particularly alkali metals, from the carbonaceous material prior to addition to the delayed coker.

It is preferred to add the carbonaceous material to the recycle feed since the high temperature of the recycle stream will partially dissolve the carbonaceous material to form an easily handleable slurry. The addition may occur either before or after the recycle stream passes through the fractionator of the delayed coking process, but since addition upstream of the fractionator column plugging, addition downstream of the fractionator is more preferred.

The solid product from delayed coking process of this invention is a highly porous petroleum coke. Similar to the coke product described in U.S. Pat. No. 2,412,879, the coke product of this invention is more easily removable from coking drums than more conventional petroleum coke. However, even more importantly, the coke product of this invention is an electrode grade coke having superior grindability qualities which is suitable for use as a filler in the manufacture of electrodes.

To produce electrode filler material from delayed coke, the coke must be calcined. Calcination eliminates volatile substances from the coke and transforms the heavy hydrocarbons into additional coke. The coke to be calcined is first crushed to a maximum size of about 50 mm. The treatment can take place in either an inert atmosphere or in an active atmosphere of flue gas. However, coke calcined in the presence of active flue gases can burn and cause coke yields to be reduced. Generally, the calcination process is considered to be terminated around 1300° C (about 2400° F), although temperatures as high as 1500° C have been used. At higher temperatures, graphitization starts. During calcination, total porosity and real density of the coke particles are increased, as well as fixed carbon content. Electrical resistivity is decreased, as is hydrogen and water content.

Coke produced by continuous contact and fluid processes are known to calcine less satisfactorily than delayed coke because of their hardness. For example, the coke produced according to the continuous process described in U.S. Pat. No. 2,412,879 is harder and more difficult to grind and to calcine than the sponge coke product of the present invention. Of course, the market for by-product coke ordinarily has little influence on a refiner's decision to adopt coking or on his choice of a coking process since his principal concern is the quality and yield of distillates to be obtained from coking heavy residual fractions. However, the process of the present invention makes delayed coking processes more attractive because it allows the efficient conversion of abundant, low-cost carbonaceous materials to more valuable products and it provides an economically attractive way of melting the expanding demand for aluminum anodes, electrodes, and other end uses requiring a calcined coke.

The calcined sponge coke of this invention is particularly suitable for the manufacture of carbon electrodes — either amorphous carbon electrodes or graphite electrodes — by methods well-known in the prior art. To make amorphous carbon electrodes from the calcined sponge coke of this invention, the calcined coke is crushed to maximum particle sizes of 50 mm, preferably about 10–20 mm and hot-mixed with a pitch binder. The resulting soft mass is either extruded or molded to the finished electrode shape and the green electrodes are baked at about 950° C (generally within the range from 600° to 1100° C) to produce a finished amorphous carbon electrode. To make graphite electrodes from the calcined sponge coke of this invention, the calcined coke is crushed to particle size less than 10–20 mm and hot-mixed with a pitch binder. The resulting soft mass is either extruded or molded to the finished electrode shape and the green electrodes are graphitized by heating them in an inert atmosphere at graphitizing temperatures — for example, 2600° to 3000° C.

These carbon electrodes have a wide variety of applications in the electrolytic and electrothermal industries, e.g., Shreve, *Chemical Process Industries,* 244 (3rd ed. 1967). However, the main use of electrode grade petroleum coke is as a filler in the manufacture of carbon anodes employed in the electrolytic production of aluminum.

In addition to its use as a filler in the manufacture of carbon electrodes, the high surface area and corresponding structure of porosity indicate that the petroleum sponge coke of this invention may be a particularly advantageous material from which activated carbon may be produced since activated carbon is characterized by its very great surface area and pore volume. Activation is a physical change wherein the surface of the carbon feed is tremendously increased by the removal of hydrocarbons from the carbon surface. Several methods are known in the prior art for effecting this activation. The most widely employed methods are the treatment of the carbonaceous reactant with oxidizing gases such as air, steam, or carbon dioxide and the carbonization of the reactant in the presence of chemical agents such as zinc chloride or phosphoric acid. The former, oxidizing treatment is the activation method most suited for producing activated carbon from the petroleum sponge coke of this invention.

Following is a description by way of example of the method and product of this invention:

EXAMPLE 1

Deashed coal was mixed with themofor catalytic cracker syntower bottoms and coked in a tubular furnace under the atmosphere. Fluffy coke was formed which did not adhere to the glazed alumina boat. The coke particles were fine and shiny, indicating substantial graphitization — a coke highly suitable for use in the production of electrodes.

EXAMPLES 2-4

Agha Jari 850° F residuum was coked with and without lignite and wood (sawdust) as additives. The respective feed mixtures were heated as fast as possible and kept at 900° F for 8 hours. In this heating process, light ends were distilled off and heavy ends cracked and condensed producing light products and coke. These cokes were analyzed for surface area, particle and true densities, and pore volume. The results of these analyses are summarized in Table 2.

Table 2
Coking Results

| Feed: | | | |
|---|---|---|---|
| Agha Jari 850° F+. % | 100 | 90 | 90 |
| Lignite, % | — | 10 | — |
| Wood, % | — | — | 10 |
| Coke Inspection | | | |
| Surface area, m²/g | 0.9 | 18.3 | 4.4 |
| Real Density, g/cc | 1.42 | 1.46 | 1.33 |
| Particle Density, g/cc | 1.28 | 1.29 | 1.27 |
| Pore volume, cc/g | 0.081 | 0.09 | 0.036 |
| Yield of Coke, % | 10.7 | 14.7 | 16.9 |
| Coke from Lignite, %[1] | — | 5.1 | — |
| Coke from Wood, %[1] | — | — | 7.3 |
| Conversion to coke, % | | | |
| Residuum | 10.7 | — | — |
| Lignite[2] | — | 51.0 | — |
| Wood[2] | — | — | 73.0 |

(1) Obtained by: Coke yield − 10.7 × 0.9.
(2) On as received basis; moisture contents of wood was 21%; lignite was 21.8%.

Assuming that there was no interaction between the petroleum feed and the additive, it was estimated that the coke yields of lignite and wood were 51 percent and 73 percent respectively. These yields are consistent with those of conventional pyrolysis. Therefore, when petroleum coke and other liquid and gaseous products of the coking process are more valuable than lignite or wood themselves, coking of petroleum residua with lignite and/or wood is an economically attractive proposition.

The surface areas of the product cokes were increased 20 and 5 folds over the control run when 10 percent of lignite and wood, respectively, were added to the coker feed. Furthermore, when 10 percent lignite was added, the pore volume of the product coke increased more than 10 percent over that of the control run product coke. Crushing resistance and, hence, grindability are known to be related to porosity; crushing resistance increases linearly with decreases in total porosity. Given the dramatic increase in surface area and the more moderate increase in pore volume when lignite is added to the coker feed, the product coke from this example has significantly improved grindability qualities. The fact that the densities of the product coke increased slightly when lignite was added to the control run feed is due in part to the greater density of lignite (1.1–1.4 g/cc) as compared to the residuum feed (about 1.0 g/cc) and may also be due in part to the increased graphitization of the product from the 10 percent lignite feed.

The results of the 10 percent wood run are not as favorable as those of the 10 percent lignite run, but the fourfold increase in surface area again supports the inference that the product coke has superior grindability qualities as compared as compared to the control run. The lower pore volume of the 10 percent wood coke product indicates that it has a finer pore structure but retains the uniformly porous character of the "sponge coke" characteristic of this invention. The fact that the densities of the product coke decreased slightly when wood was added to the control run feed is due primarily to the lower density of the sawdust (the density of wood ranges from approximately 0.5 to 1.1 g/cc) as compared to the residuum feed (about 1.0 g/cc).

The results of both the 10 percent wood run and the 10 percent lignite run are consistent with and support the attainment of the principal object of this invention: to eliminate or reduce the formation of shot coke and promote the formation of high quality, easy-to-grind petroleum sponge coke. While not wishing to be bound by any particular theory of operability, it is believed that the addition of oxygen-containing carbonaceous material which decomposes at coking temperatures to delayed coker fresh and/or recycle feed produces better, "easier-to-grind" sponge coke through the following mechanisms:

(1) pyrolysis of the oxygen-containing additive generates gases which disturb crystal growth and make the coke especially porous and
(2) the asphaltic content of the additives induce the formation of additional nuclei so that crystal size is limited.

The unexpectedly high surface areas of the sponge cokes produced by the process of this invention indicate a uniform, fine-pored structure. Thus, the formation of hard, dense, graphitic particles up to about one inch in diameter — i.e., shot coke — is minimized or eliminated.

What is claimed is:

1. In a delayed coking process for producing petroleum coke wherein a hydrocarbon feedstock is charged to a coking furnace, heated to coking temperature, charged to a coking drum, and maintained therein at coking conditions until petroleum coke is formed, and a petroleum coke product is periodically recovered from the coking drums; a method for minimizing shot coke formation which comprises adding from 0.5 to 20 percent by weight of a carbonaceous material which contains from 5 to 60 percent by weight of oxygen and which decomposes at the coking temperature to the hydrocarbon feedstock.

2. The process of claim 1 wherein the hydrocarbon feedstock is a refractory, aromatic hydrocarbon feedstock.

3. In a delayed coking process for producing petroleum coke wherein a hydrocarbon feedstock is charged to a coker furnace, heated to coking temperature, charged to a coking drum and maintained therein at coking conditions until petroleum coke is formed, and a petroleum coke product is periodically recovered from the coking drums; a method for minimizing shot coke formation which comprises adding from 0.5 to 20 percent by weight of a carbonaceous material selected from the group consisting of coal and lignite which carbonaceous material contains from 5 to 60 percent by weight of oxygen and decomposes at the coking temperature to the hydrocarbon feedstock.

4. The process of claim 3 wherein the particle size of the carbonaceous material is 50 mesh or less.

5. The process of claim 4 wherein the carbonaceous material is selected from the group consisting of subbituminous coal and lignite.

6. The process of claim 3 wherein the carbonaceous material is added to delayed coker fresh feed.

7. The petroleum sponge coke produced by the process of claim 3.

8. The process of claim 3 wherein the carbonaceous material is added to delayed coker recycle feed.

9. An improved delayed coking process wherein a refractory, aromatic hydrocarbon feedstock is charged to a coker furnace, heated to coking temperature, charged to a coking drum, and maintained therein at coking conditions until petroleum coke is formed, and a high quality petroleum sponge coke product suitable for the manufacture of carbon electrodes is periodically recovered from the coking drum, the improvement which comprises adding from 0.5 to 20 percent by weight of an oxygen-containing carbonaceous material selected from the group consisting of coal and lignite which carbonaceous material decomposes at the coking temperature to the aromatic hydrocarbon feedstock.

10. The process of claim 9 wherein from 0.5 to 10 percent by weight of the oxygen-containing carbonaceous material is added to the delayed coker recycle feed.

11. The process of claim 9 wherein the oxygen content of the oxygen-containing carbonaceous material is greater than 5 percent by weight.

12. The process of claim 11 wherein the particle size of the oxygen-containing carbonaceous material has been reduced to at least 50 mesh.

13. The process of claim 12 wherein the oxygen-containing carbonaceous material is subbituminous coal.

14. The process of claim 12 wherein the oxygen-containing carbonaceous material is deashed coal.

15. The process of claim 12 wherein the oxygen-containing carbonaceous material is lignite.

16. The process of claim 9 wherein the carbonaceous material is added to delayed coker recycle feed.

17. A process for the production of filler material for the manufacture of carbon electrodes which comprises:
 a. adding from 0.5 to 20 percent by weight of a −50 mesh carbonaceous material selected from the group consisting of coal and lignite which carbonaceous material contains from 5 to 60 percent by weight of oxygen and decomposes at the coking temperature to heavy residue passing from the bottom of a delayed coker fractionator to form a modified delayed coker recycle stream,
 b. combining a preheated, refractory, aromatic, hydrocarbon feedstock with the modified delayed coker recycle stream,
 c. raising the temperature of the resulting mixture in a heating means to a temperature of about 800°–1100°;
 d. passing the heated mixture to a delayed coking drum where the residence time is sufficient for coke to form and settle from the mixture,
 e. removing vapors from the coking drum and passing them to the fractionator to separate gas, gasoline, and gas oil from a heavy residue which is recycled,
 f. removing a uniformly porous sponge coke product from the coking drum, after coke builds up to a predetermined level in the delayed coking drum,
 g. crushing the sponge coke product to a maximum size of 50 mm,
 h. calcining the crushed sponge coke at temperatures up to about 1200° to 1500° C, and
 i. crushing the calcined sponge coke to particle sizes less than about 10–20 mm to produce a filler material for the manufacture of carbon electrodes.

18. The process of claim 17 wherein the carbonaceous material is added to the preheated, refractory, aromatic, hydrocarbon feedstock.

19. The process of claim 17 wherein the refractory, aromatic hydrocarbon feedstock is selected from the group consisting of slurry and decanted oils from catalytic cracking of petroleum derived streams and tars from thermal cracking of petroleum-derived streams.

20. The process of claim 19 wherein the carbonaceous material is selected from the group consisting of subbituminous coal and lignite.

21. The carbon electrode filler composition produced by the process of claim 20.

22. A process for the manufacture of amorphous carbon electrodes which comprises:
 a. adding from 0.5 to 20 percent by weight of a −50 mesh carbonaceous material selected from the group consisting of subbituminous coal and lignite which carbonaceous material contains from 5 to 60 percent by weight of oygen and decomposes at the coking temperature to heavy residue passing from the bottom of a delayed coker fractionator to form a modified delayed coker recycle stream,
 b. combining a preheated, refractory, aromatic, hydrocarbon feedstock with the modified delayed coker recycle stream,
 c. raising the temperature of the resulting mixture in a heating means to a temperature of about 800°–1100° F,
 d. passing the heated mixture to a delayed coking drum where the residence time is sufficient for coke to form and settle from the mixture,
 e. removing vapors from the coking drum and passing them to the fractionator to separate gas, gasoline, and gas oil from a heavy residue which is recycled,
 f. after coke builds up to a predetermined level in the delayed coking drum, removing a uniformly porous sponge coke product from the coking drum,
 g. crushing the sponge coke product to a maximum size of 50 mm,
 h. calcining the crushed sponge coke at temperatures up to about 1200° to 1500° C,
 i. crushing the calcined sponge coke to particle sizes of about 10–20 mm to produce a filler material for the manufacture of carbon electrodes,
 j. hot-mixing the electrode filler material with a pitch binder to form a soft mass,
 k. shaping the soft mass to form a green electrode, and 1. baking the green electrode at a temperature between 600° and 1100° C for a sufficient period of time to produce a finished amorphous carbon electrode.

23. The amorphous carbon electrode produced by the process fo claim 22.

24. A process for the manufacture of graphite electrodes which comprises:
   a. adding from 0.5 to 20 percent by weight of a −50 mesh carbonaceous material selected from the group consisting of coal and lignite which carbonaceous material contains from 5 to 60 percent by weight of oxygen and decomposes at the coking temperature to heavy residue passing from the bottom of a delayed coker fractionator to form a modified delayed coker recycle stream,
   b. combining a preheated, refractory, aromatic, hydrocarbon feedstock with the modified delayed coker recycle stream,
   c. raising the temperature of the resulting mixture in a heating means to a temperature of about 800°–1100° F,
   d. passing the heated mixture to a delayed coking drum where the residence time is sufficient for coke to form and settle from the mixture,
   e. removing vapors from the coking drum and passing them to the fractionator to separate gas, gasoline, and gas oil from a heavy residue which is recycled,
   f. after coke builds up to a predetermined level in the delayed coking drum, removing a uniformly porous sponge coke product from the coking drum,
   g. crushing the sponge coke product to a maximum size of 50 mm,
   h. calcining the crushed sponge coke at temperatures up to about 1200° to 1500° C,
   i. crushing the calcined sponge coke to particle sizes less than about 10–20 mm to produce a filler material for the manufacture of carbon electrodes,
   j. hot-mixing the electrode filler material with a pitch binder to form a soft mass,
   k. shaping the soft mass to form a green electrode, and
   l. graphitizing the green electrodes in an inert atmosphere at temperatures up to 2600° to 3000° C to produce a finished graphite electrode.

25. The graphite electrode produced by the process of claim 24.

26. A process for the manufacture of activated carbon which comprises:
   a. adding from 0.5 to 20 percent by weight of a −50 mesh carbonaceous material selected from the group consisting of coal and lignite which carbonaceous material contains from 5 to 60 percent by weight of oxygen and decomposes at the coking temperature to heavy residue passing from the bottom of a delayed coker fractionator to form a modified delayed coker recycle stream,
   b. combining a preheated, refractory, aromatic, hydrocarbon feedstock with the modified delayed coker recycle stream,
   c. raising the temperature of the resulting mixture in a heating means to a temperature of about 800°–1100° F;
   d. passing the heated mixture to a delayed coking drum where the residence time is sufficient for coke to form and settle from the mixture,
   e. removing vapors from the coking drum and passing them to the fractionator to separate gas, gasoline, and gas oil from a heavy residue which is recycled,
   f. after coke builds up to a predetermined level in the delayed coking drum, removing a uniformly porous sponge coke product from the coking drum, and
   g. activating the uniformly and porous sponge coke to produce an activated carbon.

27. The activated carbon produced by the process of claim 26.

* * * * *